United States Patent
Farmer et al.

(10) Patent No.: US 8,135,097 B2
(45) Date of Patent: Mar. 13, 2012

(54) SEQUENTIAL TRACKING AND OFFLINE DEMODULATION IN RECEIVER

(75) Inventors: Dominic Gerard Farmer, Los Gatos, CA (US); Emilija M. Simic, La Jolla, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 12/323,208

(22) Filed: Nov. 25, 2008

(65) Prior Publication Data

US 2009/0215419 A1 Aug. 27, 2009

Related U.S. Application Data

(60) Provisional application No. 60/991,554, filed on Nov. 30, 2007.

(51) Int. Cl.
*H04L 27/06* (2006.01)
(52) U.S. Cl. ......................... 375/344; 375/340
(58) Field of Classification Search .......... 375/324–327, 375/344, 340
See application file for complete search history.

(56) References Cited

U.S. PATENT DOCUMENTS

| 4,894,842 | A | 1/1990 | Broekhoven et al. |
| 5,917,864 | A * | 6/1999 | Asahara ............ 375/344 |
| 6,023,491 | A * | 2/2000 | Saka et al. ............ 375/326 |
| 6,813,309 | B1 * | 11/2004 | Ogino ................ 375/148 |
| 7,230,568 | B2 | 6/2007 | Rao et al. |
| 7,577,216 | B2 * | 8/2009 | Zhang ............... 375/343 |
| 2004/0165656 | A1 * | 8/2004 | Shiue et al. ............ 375/150 |
| 2007/0201539 | A1 * | 8/2007 | Yu et al. ............... 375/148 |

FOREIGN PATENT DOCUMENTS

WO WO03036322 5/2003

OTHER PUBLICATIONS

International Search Report & Written Opinion—PCT/US2008/084890, International Search Authority—European Patent Office—Apr. 14, 2009.

* cited by examiner

*Primary Examiner* — Emmanuel Bayard
(74) *Attorney, Agent, or Firm* — Shyam K. Parekh; Howard H. Seo

(57) ABSTRACT

An apparatus and method for tracking a desired signal by sequentially tracking the desired signal with a variable integration time, performing automatic frequency control of the desired signal, and demodulating the desired signal using offline software. In one aspect, the automatic frequency control is performed using the offline software. In one aspect, the desired signal is from a GPS satellite.

32 Claims, 14 Drawing Sheets

SEQUENTIAL TRACKING AND OFFLINE DEMODULATION IN RECEIVER

CROSS REFERENCE TO RELATED APPLICATION

This application claims the benefit of Provisional Application No. 60/991,554, filed Nov. 30, 2007, titled "Sequential Tracking and Offline Demodulation in Receiver," which is incorporated herein by reference in its entirety.

FIELD

This disclosure generally relates to apparatus and methods for receiver tracking and demodulation.

BACKGROUND

Position determination techniques using Satellite Positioning Systems (SPSs) have a large variety of uses in commercial, government and private applications. In navigational applications, such as those in which the user aims to follow a particular trajectory while mobile, it is often desirable that the receiver provide continuous position fixes at a constant rate. These applications typically require that the receiver tracks each available SPS satellite and demodulates the navigation data continuously.

Typically, conventional SPS receivers cannot provide continuous tracking and demodulation under conditions of low received signal levels and/or high signal dynamics in the range and Doppler dimensions. The high signal dynamics may be caused by the relative motion between the satellite and the user device or by the relative frequency drift between the satellite oscillator and user device oscillator. These adverse reception conditions typically require variable processing schemes to optimize performance. However, using conventional hardware solutions, it is difficult or impossible to implement such adaptive processing schemes in real time.

SUMMARY

Software-based off-line processing can be used to achieve signal processing versatility. In one aspect, the real-time searching (acquisition) processing is decoupled from the off-line frequency tracking and demodulation functions. One advantage of decoupling the real-time searching processing is optimization of the frequency tracking and data demodulation functions without real-time processing constraints. Another advantage provided by this open-loop processing is that the signal presence can be ratified by a highly robust sequential loop before a more fragile carrier loop tracking closure is attempted. This process may also allows for a sanity check on the closed loop operating frequency, detection of False Locks, rapid loop initialization and/or confirmation of signal presence.

Disclosed is an apparatus and method for receiver tracking and demodulation. According to one aspect, a receiver for tracking and data demodulation comprising: a sequential tracking unit for sequentially tracking a desired signal with a variable integration time; a closed loop for carrier tracking comprising an automatic frequency control (AFC) loop to perform automatic frequency control of the desired signal; and a data demodulation unit to demodulate the desired signal using offline software.

Some embodiments of the present invention provide for a satellite receiver, such as a GPS receiver, for tracking and data demodulation comprising: a sequential tracking unit to sequentially track a desired satellite signals, such as a GPS signal, with a variable integration time from a satellite; an automatic frequency control loop to perform automatic frequency control of the desired satellite signal; and a data demodulation unit to demodulate the desired satellite signal using offline software.

Some embodiments of the present invention provide for a method for tracking a desired signal comprising: sequentially tracking the desired signal with a variable integration time; performing automatic frequency control of the desired signal using offline software; and demodulating the desired signal using the offline software.

Some embodiments of the present invention provide for a computer-readable medium including program code stored thereon, comprising: program code to sequentially track a desired signal with a variable integration time; program code to perform automatic frequency control of the desired signal using offline software; and program code to demodulate the desired signal using the offline software.

Some embodiments of the present invention provide for a receiver for tracking and data demodulation comprising: a baseband mixer having an output for providing I/Q data; a sequential tracking unit to sequentially track a desired signal with a variable integration time, the sequential tracking unit comprising an integrator having an input coupled to the output of the baseband mixer to receive the I/Q data, the integrator using a variable integration time; a peak processor coupled to the integrator; and a controller coupled to the peak processor to provide an adjustment signal; and an automatic frequency control (AFC) loop to perform automatic frequency control of the desired signal, the AFC loop comprising a data input coupled to the output of the baseband mixer to receive the I/Q data; a control input coupled to the controller to receive the adjustment signal; and a data demodulation unit to demodulate the desired signal.

Some embodiments of the present invention provide for a receiver for tracking and data demodulation comprising: means for mixing a signal to provide I/Q data; means for sequentially tracking the desired signal with a variable integration time, the act of sequentially tracking comprising means for integrating the I/Q data to form integrated data; means for detecting a peak of the integrated data; and means for controlling an adjustment signal; means for performing automatic frequency control of the desired signal based on the adjustment signal; and means for demodulating the desired signal.

Some embodiments of the present invention provide for a method for tracking a desired signal comprising: mixing a signal to provide I/Q data; sequentially tracking the desired signal with a variable integration time, the act of sequentially tracking comprising integrating the I/Q data to form integrated data; detecting a peak of the integrated data; and controlling an adjustment signal; performing automatic frequency control of the desired signal based on the adjustment signal; and demodulating the desired signal.

Some embodiments of the present invention provide for a computer-readable medium including program code stored thereon, comprising: program code to sequentially tracking the desired signal with a variable integration time, the act of sequentially tracking comprising program code to integrate I/Q data to form integrated data; program code to detect a peak of the integrated data; and program code to control an adjustment signal; program code to perform automatic frequency control of the desired signal based on the adjustment signal; and program code to demodulate the desired signal.

Some embodiments of the present invention provide one or more of the following features and advantages: (1) the data demodulation processing can be performed whenever a sequential tracking mode is active; (2) a variable length integration scheme and its control logic are available; and (3) data is collected during the searcher integration and then is demodulated offline in software. In some embodiments, the data demodulation processing is not used to derive hardware controls. Instead, coherent I/Q data are collected at a sufficiently high rate to avoid significant Doppler loss and are processed off-line. This scheme achieves the dual aim of: (a) supporting continuous data demodulation across the entire signal level operating range; and (b) allowing variable bandwidth tracking schemes to maximize performance under high signal dynamic conditions. This scheme allows a relatively simple implementation (i.e., no complex mode switching across thread boundaries, simple state machine design).

An additional feature and advantage may include: (4) the decision to open or close the automatic frequency control (AFC)/demodulation loop is based upon the robust sequential tracking loop observation. The detection of False Lock is achieved by comparing the AFC estimated frequency and Sequential Tracking estimated frequency. If the absolute difference exceeds a certain threshold, then the AFC loop is re-centered by aligning the software rotator value to be consistent with the Sequential Tracking Loop estimate.

An additional feature and advantage may include: (5) a predicted center frequency technique is used to reduce the loss due to frequency drift. The frequency estimation from the previous search is propagated to the middle time of the next search. Then the searcher will use this propagated frequency to re-center next search. This technique will provide most benefit to the steady-state cases when frequency does not drift or drifts at a rate close to constant.

An additional feature and advantage may include: (6) searcher frequency delta applied during the coherent sum collection is recorded that will allow the coherent sums to be corrected for any Sequential Tracking loop frequency modifications and will drive Frequency False Lock detection. Another advantage may include the effects of processing delay on the closed loop response of the carrier tracking loop are minimized or avoided altogether. Thus the closed loop response may be easy to guarantee.

Other aspects will become readily apparent to those skilled in the art from the following detailed description, wherein various aspects are shown and described by way of illustration. The drawings and detailed description are to be regarded as illustrative in nature and not as restrictive.

DETAILED DESCRIPTION

Figure 1:
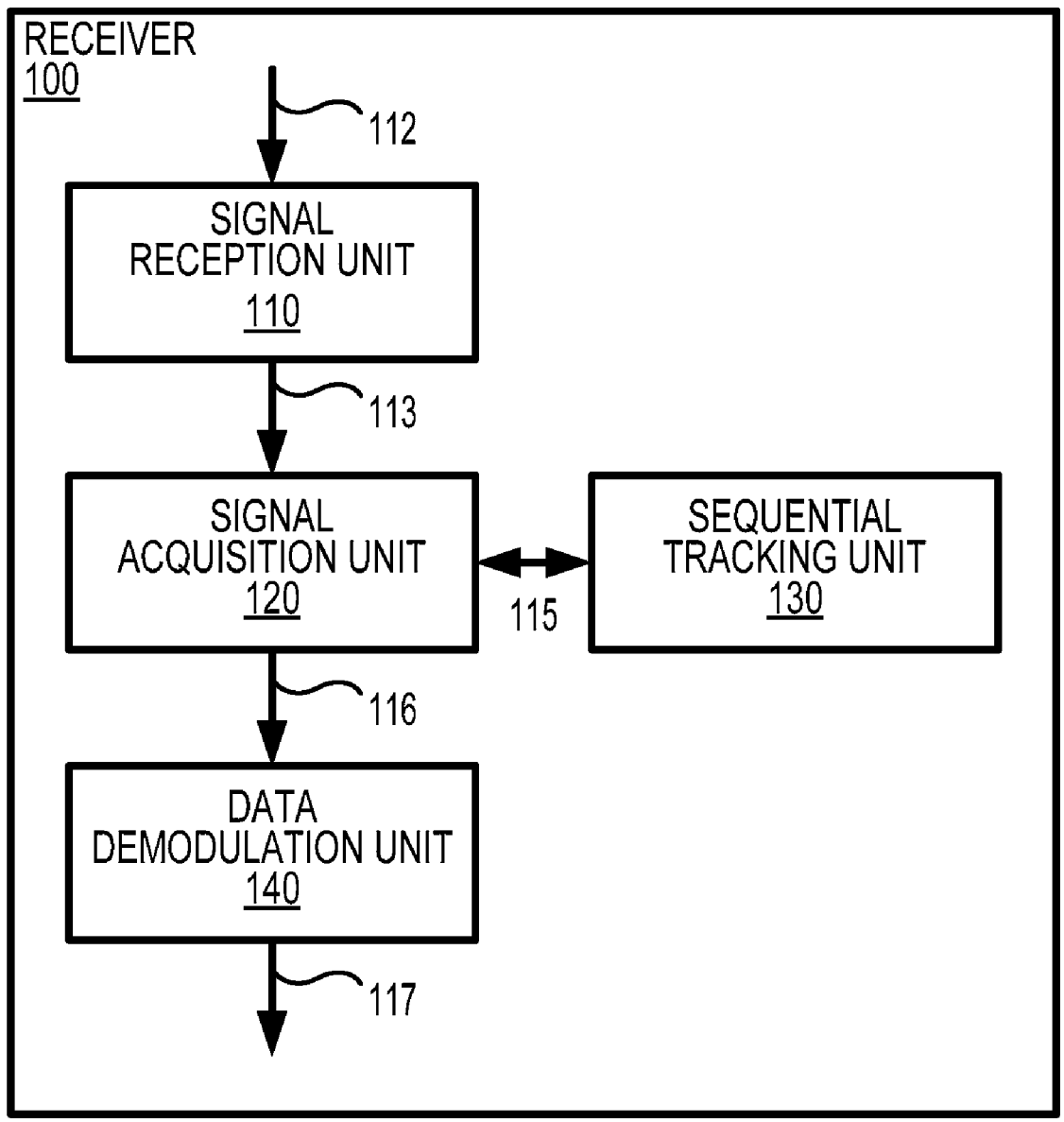
FIG. 1 illustrates an exemplary block diagram of a receiver.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The various illustrative logical blocks, modules and circuits described herein may be implemented or performed with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative logical blocks, modules and circuits described herein may also include computer-readable medium for storing software. A computer-readable medium is a storage medium that is readable by a computer.

The method and apparatus described herein may be used with various satellite positioning systems (SPSs), also referred to as global navigation satellite systems (GNSSs), such as the United States Global Positioning System (GPS), the Russian Glonass system, the European Galileo system, any system that uses satellites from a combination of satellite systems, or a satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver.

Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites. Additionally, other terrestrial sources, such as one that is used for the Advanced Forward Link Trilateration (AFLT), technique, may be used.

FIG. 1 illustrates an exemplary block diagram of a receiver 100. The receiver 100 comprises a signal reception unit 110, a signal acquisition unit 120, a sequential tracking unit 130 and a data demodulation unit 140. In one aspect, the receiver 100 is part of a larger satellite positioning system (SPS), receiving signals from SPS sources. In another aspect, the receiver 100 is part of the United States Global Positioning System (GPS), receiving signals from GPS sources. The signal reception unit 110 receives a composite RF signal 112 and converts the composite RF signal 112 to a composite digital baseband signal 113. In one aspect, the composite digital baseband signal 113 is decomposed into an in-phase component (I) and quadrature component (Q). The signal acquisition unit 120 searches the composite digital baseband signal 113 for a desired signal 115. In one aspect, the desired signal 115 is a GPS desired signal from a GPS satellite. Conventional techniques for acquiring the desired signal 115 can include a 2-dimensional search over range and Doppler dimensions.

Once acquired, the desired signal 115 is used as an input signal to the sequential tracking unit 130. The sequential tracking unit 130 maintains track of the desired signal 115 in the presence of signal dynamics. Signal dynamics refers to the fact that the strength, range and Doppler of the desired signal 115 vary with time to cause a variable strength, variable time delay or variable frequency shift during an observation period. The sequential tracking unit 130 is designed to continuously re-center itself to track the desired signal 115. The data demodulation unit 140 recovers the modulated data 116 from the desired signal 115.

In one aspect, for a current sampling period, a searcher 205 (FIG. 2A) of the sequential tracking unit 130 includes a searcher center frequency. The searcher 205 estimates the frequency (i.e., the estimated frequency) and code phase of the desired signal 115 for the current sampling period. A predicted center frequency technique is used to produce a predicted frequency of the desired frequency 115. The searcher 205 predicts the frequency (i.e., the predicted frequency) of the desired signal 115 for the next sampling period based on the estimated frequency. A searcher frequency delta 277 is defined as the difference between the predicted frequency and the searcher center frequency. Using this searcher frequency delta 277, the sequential tracking unit 130 re-centers the search center of the desired signal 115 for next sampling.

The predicted center frequency technique estimates the frequency drift rate from the difference between the estimated frequency of the current sampling period and the estimated frequency of the previous sampling period, divided by the sampling period. The predicted frequency is generated by adding the estimated frequency to the product of the frequency drift rate and the sampling period. In one aspect, the sequential tracking unit estimates a searcher frequency delta 277 and inputs the searcher frequency delta 277 (FIG. 2A) to the automatic frequency control (AFC) loop to mitigate offline software processing latency. Using the searcher frequency delta in the automatic frequency control loop maintains system performance capabilities even with the usage of offline software processing. In one aspect, the sequential tracking unit 130 and the data demodulation unit 140 are one unit. In one aspect, the sequential tracking and data demodulation units are software-based offline processes.

Figure 2A:
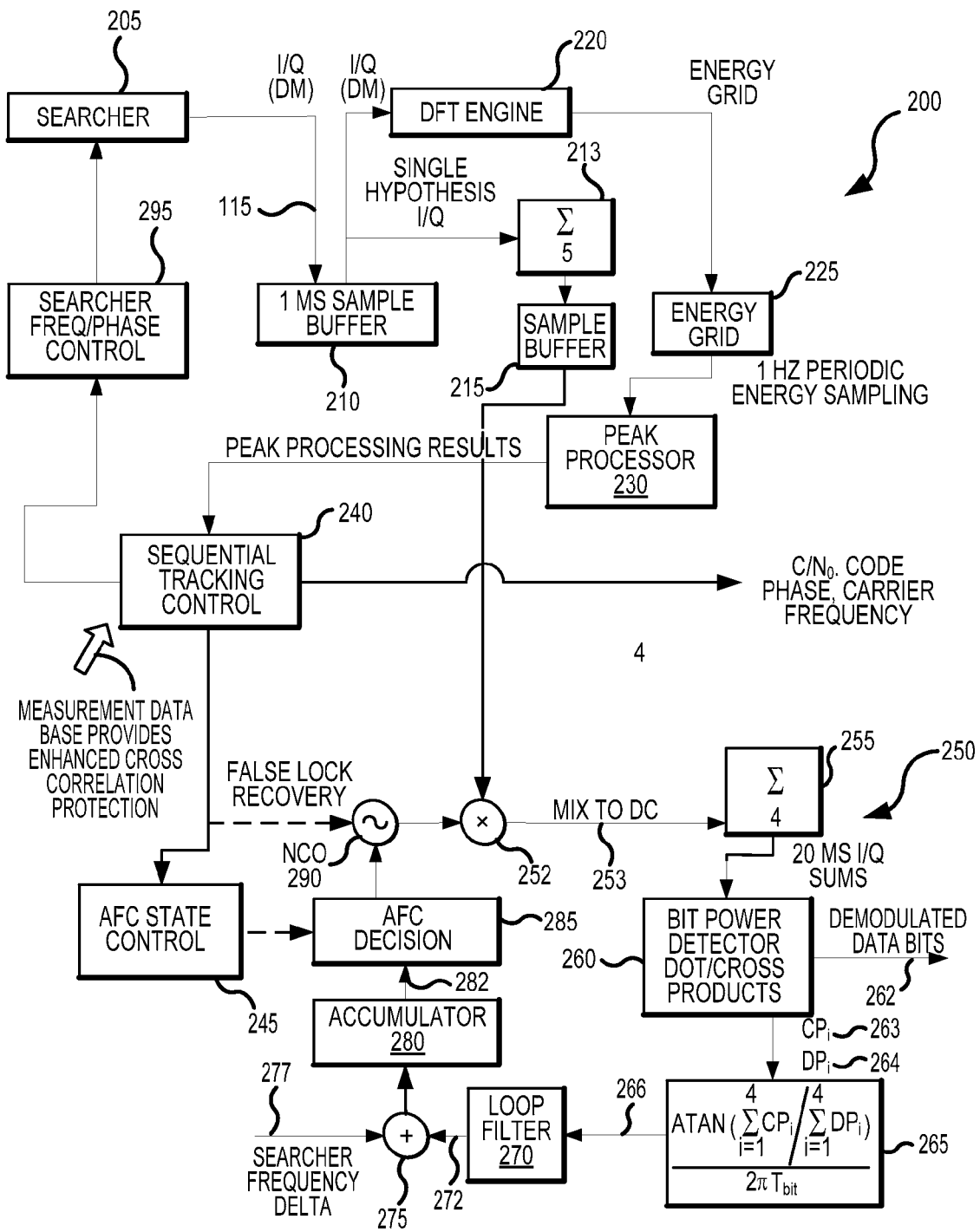
FIGS. 2A, 2B and 2C illustrate embodiments of a composite sequential tracking and data demodulation unit.

FIG. 2A illustrates a composite of the sequential tracking unit 130 and data demodulation unit 140 (referred to as composite sequential tracking and data demodulation unit 200). In one aspect, the sequential tracking unit 130 and data demodulation unit 140 are part of a larger satellite positioning system (SPS), receiving signals from SPS sources. In another aspect, the sequential tracking unit 130 and data demodulation unit 140 are part of the United States Global Positioning System (GPS), receiving signals from GPS sources. Searcher 205 acquires the desired signal 115. In one example, the searcher 205 is programmed to use asymmetric frequency bin distribution, 25-Hz bin separation, 1 millisecond (ms) bit synchronous pre-detection integration, chip×2 sample separation to generate 64 time hypotheses. The searcher 205 inputs the desired signal 115 to the first sample buffer 210.

In one aspect, the first sample buffer 210 collects 1 ms of coherent I/Q sums of the desired signal 115 and directs it to the first coherent summer 213. In one aspect, the first coherent summer 213 coherently integrates the 1-ms coherent I/Q sums over 5 ms to create 5 ms coherent I/Q sums directed by a channel controller and collected in a second sample buffer 215. One skilled in the art would understand that the values 1 ms and 5 ms are used as examples and that other values may be used without departing from the spirit or scope of the disclosure. In one example, the channel controller is external to the composite sequential tracking and data demodulation unit 200 and the second sample buffer 215 is a circular buffer. The first coherent integration time (for example, 5 ms) is aligned to the edge of the modulated data 116. One skilled in the art would understand that the first coherent integration time is not limited to 5 ms and is selected based on signal dynamics, system constraints or application parameters. Integration over a variable time period allows the sequential tracking unit to have variable bandwidths allowing it to integrate over a shorter period of time (e.g., 1 second) for a stronger signal and a longer period of time (e.g., 4 seconds) to acquire a weak signal. This integration may occur until a peak value is greater than a predetermined threshold, as described below.

The first coherent integration time is a compromise between memory sizing and coherency (Doppler) loss. Under constant frequency ramp input signal conditions, the ideal second order sequential tracking loop will exhibit a peak instantaneous frequency error of 0.5×Frequency Ramp [Hz/sec]*Sample Period [sec]. The nominal sample period of 1 sec and maximum design ramp of 35 Hz/sec will amount to a peak frequency error of 17.5 Hz and an associated loss of $20*\log_{10}(\sin c(17.5/200))$ or 0.1 dB. If the predicted center frequency technique is not used, the peak instantaneous frequency error is 1.5×Frequency Ramp [Hz/sec]*Sample Period [sec], and the associated loss is $20*\log_{10}(\sin c(1.5*35*1/200))$ or 1.0 dB. Thus the predicted center frequency technique can improve demodulation sensitivity by up to 0.9 dB.

TABLE 1

| First Coherent Integration Time (ms) | Worst case loss (dB) | Memory (16 bit words) | Number of butterfly operations to generate a 20-ms sum |
| --- | --- | --- | --- |
| 1 | 0.0044 | 40 | 80 |
| 2 | 0.0175 | 20 | 40 |
| 5 | 0.1097 | 8 | 16 |
| 10 | 0.4421 | 4 | 8 |
| 20 | 1.8267 | 2 | 0 |

Table 1 summarizes the coherency loss of choosing different first coherent integration times when sending the coherent I/Q sum to subsequent processing stages of the composite sequential tracking and data demodulation unit 200. For example if the predicted center frequency technique is assumed, the worse case instantaneous frequency error is 17.5 Hz in a 35-Hz/sec frequency ramp. The worst case loss is calculated along with the estimated memory and multiplications or butterfly operations necessary to form a 20-ms coherent I/Q sum. The values of 5 ms and 20 ms are chosen to illustrate the examples discussed. One skilled in the art would understand that other values can be used without affecting the spirit or scope of the disclosure.

In one aspect, the 5 ms coherent I/Q sum is temporarily stored in the second sample buffer 215 before proceeding to the data demodulator/AFC loop 250. The 5 ms coherent I/Q sum is multiplied by software rotator 252 with the output of a numerically controlled oscillator (NCO) 290 to produce a frequency error signal 253. The frequency error signal 253 is coherently summed in a second coherent summer 255. In one example, the second coherent integration time is 20 ms. In one aspect, the second coherent integration time is chosen to be coincident with the bit time of the modulated data 116. The 20 ms coherent I/Q sum (outputted from the second coherent summer 255) is inputted to the Bit Power Detector Dot/Cross Products Unit 260.

The Bit Power Detector Dot/Cross Products Unit 260 demodulates the 20 ms coherent I/Q sum to produce the demodulated data bits 262. The Bit Power Detector Dot/ Cross Products Unit 260 also outputs the Cross Products 263 (CP) and Dot Products 264 (DP) of the 20 ms coherent I/Q sum. CP 263 and DP 264 are inputted to the ATAN discriminator 265 to produce a raw frequency offset $\Delta f_{raw}$ 266. The raw frequency offset $\Delta f_{raw}$ 266 is filtered through loop filter 270 to produce a filtered frequency offset $\Delta f_{filtered}$ 272. The filtered frequency offset $\Delta f_{filtered}$ 272 is added to the searcher frequency delta 277 in the summer unit 275 at the symbol index when the searcher frequency delta 277 is applied. The output of the summer unit 275 is fed to the accumulator 280. An accumulator value 282 is fed to NCO 290 depending on the state of the AFC decision unit 285. The state of the AFC decision unit 285 is determined by the AFC state control unit 245. The AFC state control unit 245 calculates the frequency difference and declares a False Lock if the difference is above a predetermined threshold. If the AFC state control unit 245 declares a False Lock, it resets the AFC. For example, the sequential tracking process estimates a signal frequency as X Hz. This estimated signal frequency is passed to the AFC loop. The AFC loop estimates the signal frequency as Y Hz. The AFL loop then calculates a difference between X and Y. If the difference is larger than a predetermined threshold (for example, 12.5 Hz), the AFC loop will declare itself in a state of Frequency False Lock and will reset itself using the estimated frequency X Hz from the sequential tracking process.

Figure 2B:
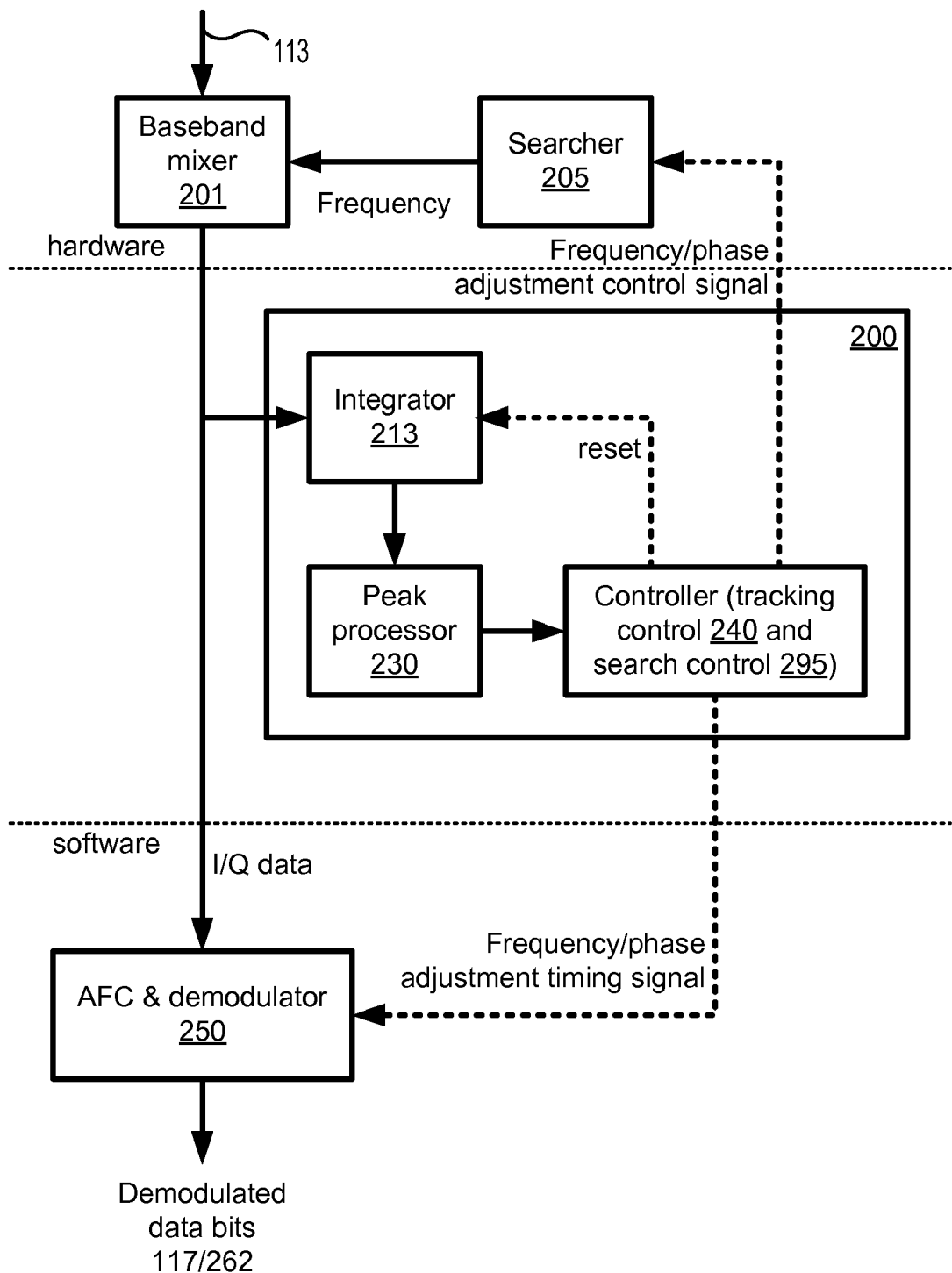

FIG. 2B illustrates another embodiment of a composite of the sequential tracking unit 130 and data demodulation unit 140. The composite unit includes both hardware and software aspects. Included as hardware is a baseband mixer 201, which accepts a mixing frequency from a searcher 205 (described above) and a composite digital baseband signal 113. The baseband mixer 201 provides I/Q data to an automatic frequency control (AFC) and demodulator unit 250. The hardware may also include a composite sequential tracking 200. Alternatively, the composite sequential tracking 200 may be formed in software or a combination of software and hardware. The software includes the automatic frequency control (AFC) and demodulator unit 250, which accepts a control signal (frequency/phase adjustment control) from the composite sequential tracking 200. By not using the AFC determined adjustment frequency or the demodulated data bits from the demodulator, the I/Q data is provided in an open loop manner that decouples the AFC from the rotator and data acquisition. That is, frequency and/or phase adjustments determined by the AFC are not fed back to the data acquisition hardware such that data acquisition is independent on the AFC unit. The data acquisition hardware does provide information to the AFC unit regarding any frequency or phase adjustments used in acquiring the I/Q data. With the hardware decoupled from the software, the circuit may be more stable.

The composite sequential tracking 200 includes an integrator 213, a peak processor 230 and a controller. The controller as described above includes a tracking controller 240 and a search controller 295. The integrator 213 received I/Q data and sums this data in an energy grid. The peak processor 230 searches the energy grid for a peak value above a predetermined threshold value. The energy grid consists of rows and column of time verses frequency data. A peak on the energy grid represents the strongest signal. If the peak in not centered on a reference point, the time offset and frequency offset from that reference point may be used to correct the input signal to have a more accurate phase and center frequency. If a peak is not found, the integrator 213 continues integrating I/Q data.

Once a peak is found (i.e., a peak value is greater than the predetermined threshold value), the controller resets the integrator (for example, with a reset signal). Base on the time and frequency offset from an ideal received signal, the controller determines an adjustment to both the time (or phase) and the frequency currently used by the searcher 205. This adjustment accounts for clock drifts and changes in Doppler frequency as well as previous frequency error. The controller then provides a frequency/phase adjustment signal to the searcher 205. The search 205 adjusts is rotator frequency used by the baseband mixer 201. The controller also provides a timing signal to the AFC and demodulator unit 250 such that the AFC may properly compensate for adjustments to the rotator frequency at the appropriate time. That is, the AFC adjusts its computed phase/frequency offset when the first I/Q data is received with the new rotator frequency. The AFC loop also determines whether the current frequency adjustment is such that the AFC below is likely in a False Lock state. The AFC loop indicates with an internal False Lock signal whether the AFC should operate in an open loop thus assisting it in recovering from a probable False Lock.

Figure 2C:
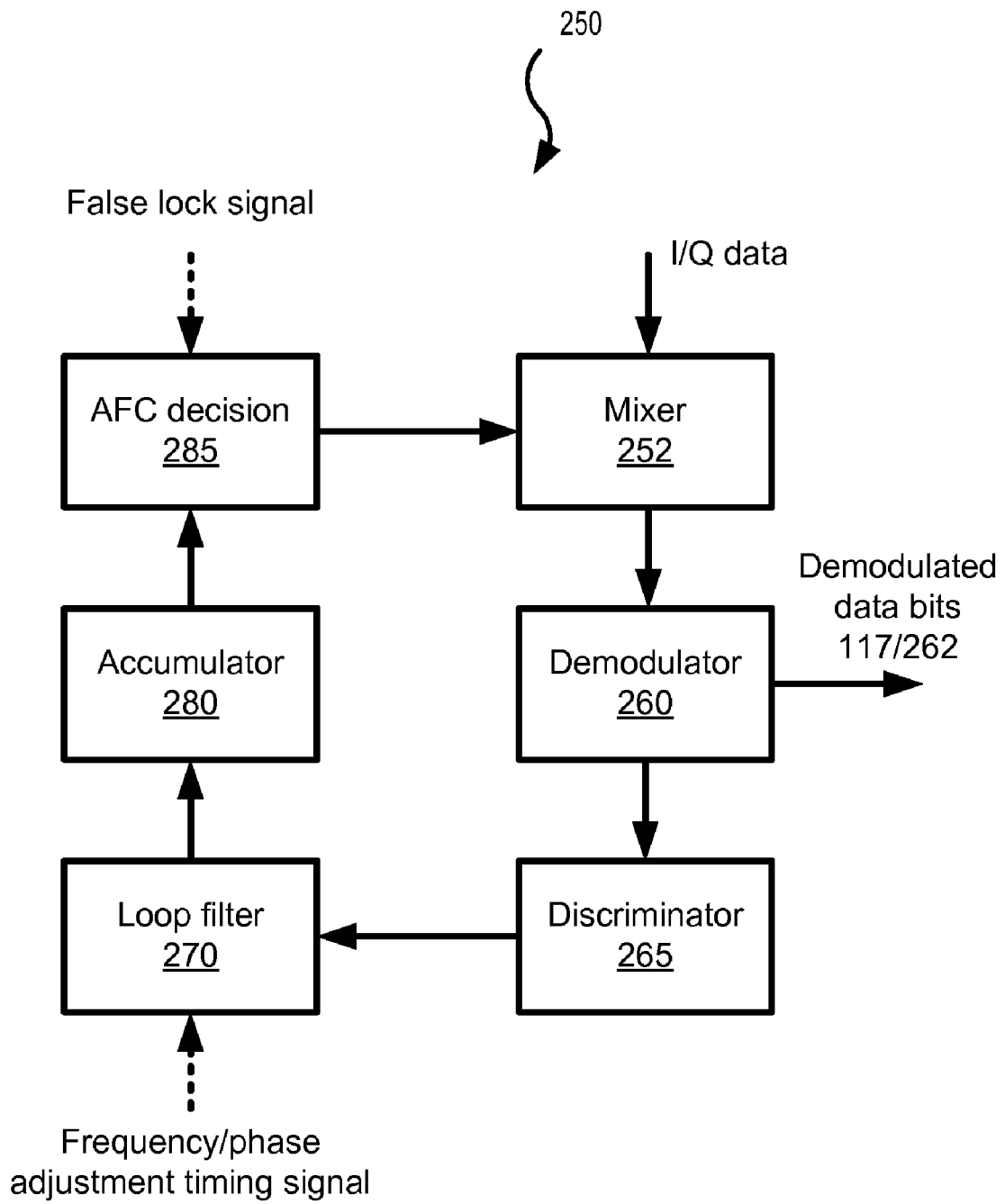

FIG. 2C illustrates an embodiment of an AFC and demodulator unit 250. The unit includes a mixer 252, a demodulator 260, a discriminator 265, a loop filter 270, an accumulator 280 and an AFC decision unit 285. The AFC decision unit 285 receives the timing signal from the controller. The mixer 252 received the I/Q data, which may have a small residual frequency component. The AFC is used to determine this residual frequency. The mixer 252 accepts the AFC determined residual frequency and mixed it with the I/Q data to provide DC I/Q data. Unlike other AFC circuits, the AFC determined residual frequency is not used by the hardware to adjust data acquisition. The demodulator 260 provides a signal to the discriminator 265 for the discriminator 265 to determine a phase rotation of the I/Q data. The discriminator 265 provides a delta frequency signal 266 to the loop filter 270. The loop filter 270 provides its filtered AFC residual frequency to the accumulator 280, which tracks the absolute frequency of the I/Q data. This absolute frequency is adjusted by any periodic adjustment to compensate changes to the frequency of the rotator provided by the searcher as described above. The AFC decision unit 285 passes this absolute frequency to the mixer 252 to complete the AFC loop.

Alternatively, if a False Lock signal indicates that the AFC may be in a False Lock state, the AFC decision unit 285 blocks the AFC frequency from being fed into the mixer 252 and instead provides a DC frequency (0 Hz) to the mixer 252, thus operating the AFC in open loop and passing the I/Q data unmodified to the demodulator 260. In some embodiments described above, a False Lock state is determined based on a difference between estimated frequencies (the AFC loop estimated frequency and the signal tracking process estimated frequency). Separately from the determination of False Lock, the AFC loop may operate in either closed-loop mode or open-loop mode.

That is, the AFC loop (or data demodulation unit) demodulates over an operating range of the desired signal. For example, the AFC may select between open loop and closed loop based on a computed $C/N_0$ (or equivalently, SNR) falling within an operating range, or equivalently, above or below a predetermine threshold. If $C/N_0$ [dB-Hz] is below a predetermined threshold, the AFC loop will operator in an open mode and if $C/N_0$ is above the predetermined threshold, the AFC loop will operator in a closed mode. Frequency false lock doesn't mean the AFC loop will be open or not. The False Lock determination and the open-loop/closed-loop determination are determined independently from one another.

Second Order AFC Loop

Figure 3:
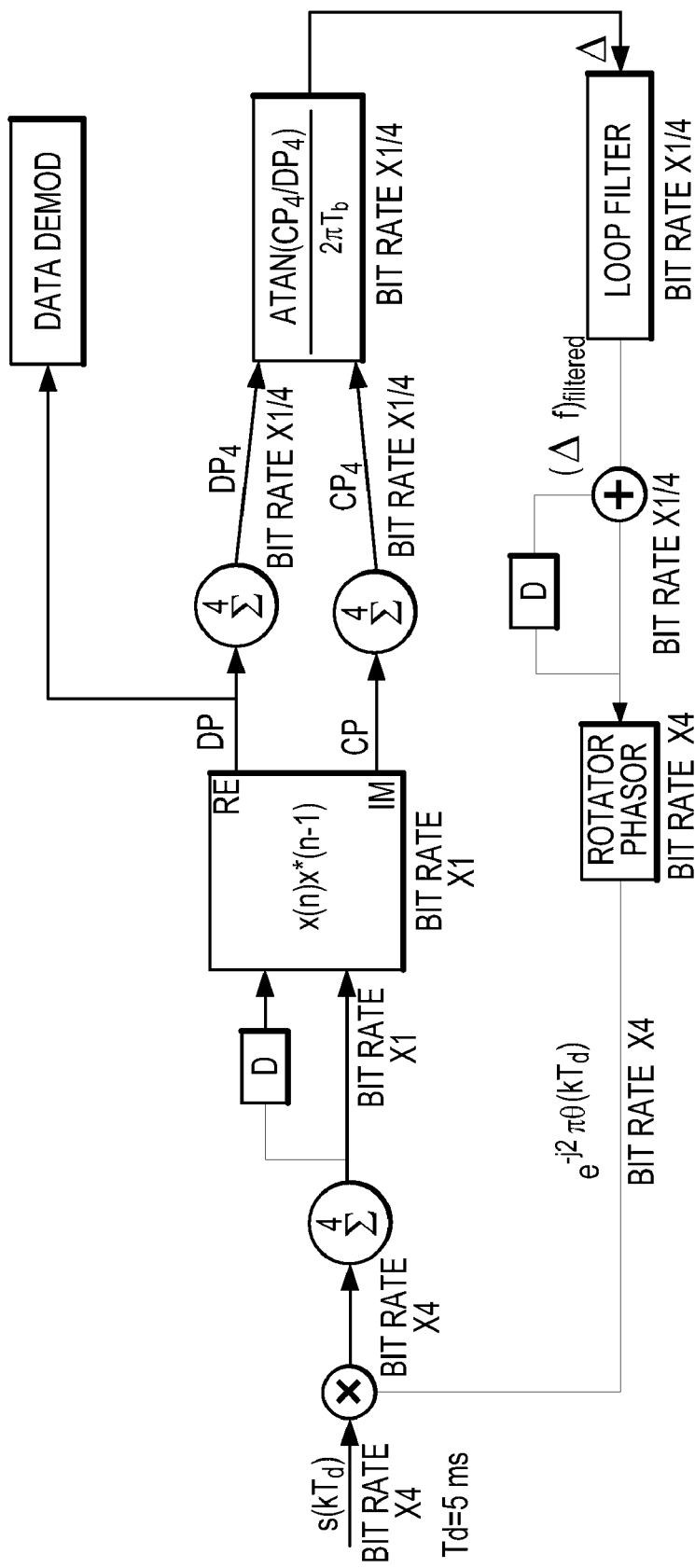
FIG. 3 illustrates the second order AFC loop operations of the data demodulator/AFC loop.

FIG. 3 illustrates the second order AFC loop operations of the data demodulator/AFC loop 250. The second order AFC loop filter is used to achieve zero steady state error in the presence of a frequency ramp. The raw frequency offset $\Delta f_{raw}$ 266 from the ATAN discriminator 265 is not dependent on the SNR (signal-to-noise ratio). The second order AFC loop characteristics including damping ratio $\zeta$ and noise bandwidth $B_I$ do not change with SNR. One skilled in the art would understand that other order (e.g., first order, third order, etc.) AFC loop filters can be used without affecting the scope and spirit of this disclosure.

For example, if the desired tracking threshold is 20 dB-Hz, the noise bandwidth $B_I$ is chosen accordingly. The general rule of thumb for AFC tracking threshold is $$3\sigma_{AFC} = 3\sigma_{tAFC} + f_e \leq \frac{1}{4T_s} \quad (1)$$

where $3\sigma_{tAFC}$ is 3-sigma thermal noise frequency jitter, $f_e$ is dynamic stress error in the AFC tracking loop, $T_s=0.08$ seconds, $$\frac{1}{4T_s} = 3.125 \text{ Hz}. \quad (2)$$

The AFC tracking loop jitter due to thermal noise is:

$$\sigma_{tAFC} = \frac{1}{2\pi T_s} \sqrt{\frac{4FB_I}{C/N_0}\left[1 + \frac{1}{T_sC/N_0}\right]} \text{ (Hz)} \quad (3)$$

where F=1 at high $C/N_0$, and 2 near threshold. The noise bandwidth $B_I$ is solved as:

$$B_I = \frac{\pi^2 T_s^3 (\sigma_{tAFC} C/N_0)^2}{F(1 + T_sC/N_0)}. \quad (4)$$

The AFC tracking threshold is determined by thermal noise only, not by Doppler dynamics. Thus, the dynamic stress error $f_e=0$ in equation (1), the AFC tracking loop jitter $\sigma_{tAFC}=3.125/3=1.04$ Hz, F=2 near threshold, and $B_I=3.04$ Hz when $C/N_0=20$ dB-Hz. In one example, the noise bandwidth $B_I$ is rounded to 3 Hz in the second-order AFC loop to meet the tracking threshold requirement.

The natural frequency of the second-order AFC loop is $$\omega_n = 2B_I \bigg/ \left(\zeta + \frac{1}{4\zeta}\right) = 4.8 \text{ rad/sec.} \quad (5)$$

The optimal value for damping ratio $\zeta$ ranges from 0.7 to 1.14, depending on the optimization target. However, the performance criterion changes very slowly near the optimal value. In one example, the damping ratio $\zeta$ is chosen to be 1.

To implement a second-order AFC loop, first choose a continuous-time AFC loop, then convert the continuous-time AFC loop to a discrete-time AFC loop using a bilinear transform.

Figure 4:
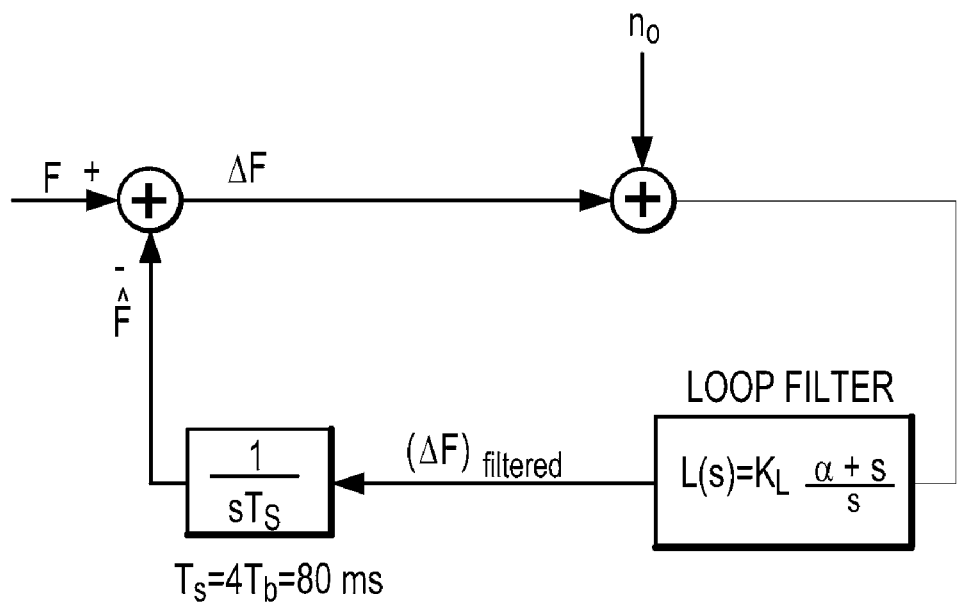
FIG. 4 illustrates a continuous time automatic frequency control (AFC) loop with a loop filter in terms of a linearized model.

FIG. 4 illustrates a continuous time automatic frequency control (AFC) loop with a loop filter in terms of a linearized model. The purpose of the continuous time automatic AFC loop is to track the incoming frequency F with the filtered frequency estimate $\hat{F}$ such that the frequency error $\Delta F = F - \hat{F}$ approaches zero. The analog loop filter transfer function $L(s)$ has the form $$L(s) = K_L \frac{\alpha + s}{s}$$

where the parameters $K_L$ and $\alpha$ are chosen from the desired natural frequency $\omega_n$ and damping ratio $\zeta$ for the second order AFC transfer function $$H(s) = \frac{2\zeta\omega_n s + \omega_n^2}{s^2 + 2\zeta\omega_n s + \omega_n^2}.$$

An important consideration in the second-order AFC design is the characteristic of the analog loop filter transfer function $L(s)$. To achieve zero steady-state error in the presence of a frequency ramp, the analog loop filter transfer function L(s) has the following form:

$$L(s) = K_L \frac{\alpha + s}{s}. \quad (6)$$

The continuous-time AFC loop transfer function is $$H(s) = \frac{\hat{F}(s)}{F(s)} = \frac{(K_L/T_s)s + (\alpha K_L/T_s)}{s^2 + (K_L/T_s)s + (\alpha K_L/T_s)} \quad (7)$$

where $\omega_n = \sqrt{\frac{\alpha K_L}{T_s}}$ and $\zeta = \frac{1}{2}\sqrt{\frac{K_L}{\alpha T_s}}$ and where $\alpha$ and $K_L$ are derived from $\zeta$ and $\omega_n$ as $$\alpha = \frac{\omega_n}{2\zeta} \text{ and } K_L = 2\zeta\omega_n T_s, \quad (8)$$

The continuous-time AFC loop transfer function is expressed directly in terms of $\zeta$ and $\omega_n$ as $$H(s) = \frac{2\zeta\omega_n s + \omega_n^2}{s^2 + 2\zeta\omega_n s + \omega_n^2}, \quad (9)$$

Therefore, the analog loop filter transfer function can be derived in terms of $\zeta$ and $\omega_n$ as $$L(s) = T_s \frac{2\zeta\omega_n s + \omega_n^2}{s} \quad (10)$$
$$= 2\zeta\omega_n T_s + \frac{\omega_n^2 T_s}{S}.$$

To implement the analog loop filter in discrete-time, a bilinear transform is used. Replace S in L (s) with $$s = \frac{2}{T_s} \cdot \frac{1-z^{-1}}{1+z^{-1}}. \quad (11)$$

The result of the bilinear transform is the loop filter 270 (FIG. 2A) with digital loop filter transfer function L(z):

$$L(z) = 2\zeta\omega_n T_s + \frac{\omega_n^2 T_s^2 (1+z^{-1})}{2(1-z^{-1})} \quad (12)$$
$$= \frac{T_s^2}{2} \cdot \frac{(\omega_n^2 + 4\zeta\omega_n/T_s) + (\omega_n^2 - 4\zeta\omega_n/T_s)z^{-1}}{1-z^{-1}}$$

Digital loop filter transfer function L (z) can also be rewritten as $$L(z) = K \frac{a_0 + a_1 z^{-1}}{1 - z^{-1}} \quad (13)$$

where $$K = \frac{T_s^2}{2};$$
$$a_0 = \omega_n^2 + 4\zeta\omega_n/T_s;$$

and $$a_1 = \omega_n^2 - 4\zeta\omega_n/T_s.$$

In one aspect, the key parameters in the loop filter 270 are chosen as K=0.0032, $a_0$=263.04 and $a_1$=−216.96. Alternatively, define $K_0$=$Ka_0$=0.841728 and $K_1$=$Ka_1$=−0.694272.

Figure 5:
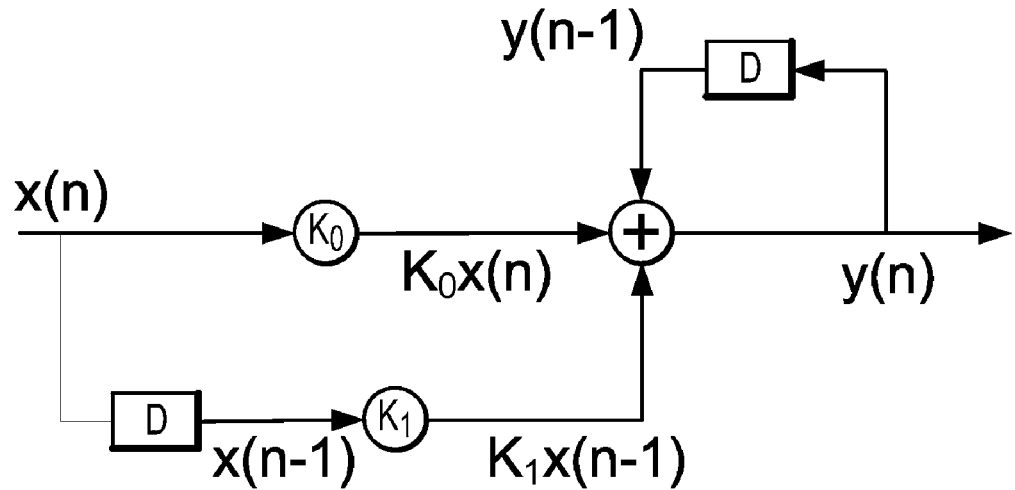
FIG. 5 illustrates an example of a digital loop filter implementation for the loop filter described in FIG. 4.

FIG. 5 illustrates an example of a digital loop filter implementation for the loop filter described in FIG. 4. In one example, the loop filter 270 is implemented as shown in FIG. 5. In this exemplary implementation, the continuous time Laplace transform of the analog loop filter L(s) is transformed into an equivalent discrete time Z-transform L(z) using the well-known bilinear transform. The resulting difference equation is of the form y(n)−y(n−1)=$K_o$x(n)+$K_1$x(n−1) where x(n) is the input sequence and y(n) is the output sequence.

The NCO 290 in FIG. 2A can be modeled as a digital accumulator, with an oscillator transfer function $$N(z) = \frac{1}{1 - z^{-1}}. \quad (14)$$

In one example, the discrete-time AFC loop transfer function is $$H(z) = \frac{K_0 z^2 + K_1 z}{(K_0 + 1)z^2 + (K_1 - 2)z + 1}. \quad (15)$$

The discrete-time AFC loop transfer function is not dependent on an SNR. Therefore, the discrete-time AFC loop is stable across all operational $C/N_0$ range, for example 20 to 55 dB-Hz.

Phase margin indicates the degree of stability of the discrete-time AFC loop. To calculate phase margin, derive the open loop transfer function as $$G(s) = \frac{2\zeta\omega_n s + \omega_n^2}{s^2}. \quad (17)$$

Set s=jω to obtain the open loop frequency transfer function as $$G(j\omega) = \frac{\omega_n^2 + j2\zeta\omega_n \omega}{-\omega^2}. \quad (18)$$

Take the magnitude of equation 18 to obtain the magnitude of the open loop frequency transfer function $$|G(j\omega)| = \sqrt{\frac{\omega_n^4 + 4\zeta^2\omega_n^2\omega^2}{\omega^4}}. \quad (19)$$

In one example, define $\omega=\omega_c$ such that $$|G(j\omega_c)|=1. \quad (20)$$

Solve equation 20 and obtain $\omega_c$=9.8793. As shown, $\omega_c$ is close to $2\zeta\omega_n$=9.6.

The phase of the open loop frequency transfer function in this example is $\angle G(j\omega_c)$=−104°. And, the phase margin is PM=−104°−(−180°)=76° which means that the discrete-time AFC loop has very good stability.

From the continuous-time AFC loop transfer function H(s), the response to an input frequency u(t) is governed by differential equation:

$$\frac{d^2f}{dt^2} + 2\zeta\omega_n\frac{df}{dt} + \omega_n^2 f = 2\zeta\omega_n\frac{du}{dt} + \omega_n^2 u \quad (21)$$

where u(t) is the input frequency as a function of t.

In one example, with a 1-Hz step input, the step response of the second order AFC loop is $$f_s(t)=1-e^{-\omega_n t}+\omega_n te^{-\omega_n t}. \quad (22)$$

The steady-state error in the presence of the 1-Hz step input is zero.

The ramp response of the second order AFC loop is $$f_r(t)=t(1-e^{-\omega_n t}) \quad (23)$$

where u(t), the input frequency, is a ramp, u(t)=t. The ramp response shows that there is no steady-state frequency error when the input frequency u(t) changes as a ramp function.

Dynamic stress error is the steady-state error caused by Doppler dynamics and oscillator drift, and it does not contain the jitter caused by thermal noise. The dynamic stress error of the second-order AFC loop, $f_e$, can be calculated as $$f_e = \frac{1}{360\omega_n^2}\frac{d^3 R}{dt^3} \quad (24)$$

where R=range.

When jerk dynamics exist, the dynamic stress error is not-zero. The maximum jerk dynamics that can be tolerated by the second-order AFC loop can be calculated by setting $C/N_0$ to infinity. Thus, $3\sigma_{tAFC}$ is much smaller than $f_e$ and can be ignored.

In one example, $f_{e,max}$=3.125 Hz. For the second order AFC loop, $$\left(\frac{d^3 R}{dt^3}\right)_{max} = 360 f_e \omega_n^2 \quad (25)$$
$$= 360 \cdot 3.125 \cdot 4.8^2$$
$$= 25920°/s^3.$$

The corresponding jerk dynamics is $$J_{max} = \frac{25920c}{360 \cdot 1575.42 \cdot 10^6} \quad (26)$$
$$= 13.7 \text{ m/s}^3.$$

The maximum jerk tolerance with 3-Hz noise bandwidth is 13.7 m/s³. This maximum jerk tolerance corresponds to 13.7*1575.42e6/3e8=72 Hz/s², and it also corresponds to 13.7/9.8=1.398 g/s.

In FIG. 2A, the first sample buffer 210 also directs the 1-ms coherent I/Q sums of the desired signal 115 through the discrete-time Fourier transform (DFT) engine 220 to the energy grid 225. Peak processing and the energy grid 225 are further described in U.S. patent application Ser. No. 12/130,520, filed May 30, 2008 and titled "Methods and Apparatuses for Processing Satellite Positioning System Signals" by inventor Emilija M. Simic, the contents of which are incorporated herein by reference in their entirety. The channel controller administers the searcher 205 and the DFT engine 220 hardware control. The modem data mover collects the searcher's 1-ms coherent I/Q sums in the first sample buffer 210; these sums are subsequently supplied to the DFT engine 220 and processed to develop an incremental accumulation to the energy grid 225.

The modem data mover channel of the DFT engine 220 is also programmed to extract the 1-ms coherent I/Q samples from a single target center searcher time bin. The transfer is performed from the input memory of the DFT engine 220. This reduces the software burden of coherent I/Q data collection and allows the first sample buffer 210 to be minimized.

A modify command is issued when a valid peak is identified in the peak processor 230. Referencing back to FIG. 2A, the searching frequency of the searcher 205 is re-centered by the searcher freq/phase control 295 when the modify command is executed. A predicted center frequency technique reduces the loss due to frequency drift. The frequency estimation from the previous search is propagated to the middle of the next second. Then the searcher 205 will use this propagated frequency to re-center next second searching. This technique will provide most benefit to the steady-state cases when frequency does not drift or drifts at a rate close to constant.

In one example, the sampling period of the energy grid 225 is nominally 1 second and the integration time is nominally 940 to 980 ms. This difference is due to a processing delay of a measurement controller. If a valid peak of the desired signal 115 is found, the energy grid 225 will be zeroed out at the completion of the measurement controller processing, since the searcher 205 may be re-centered by a modify command issued by the measurement controller when the valid peak is found.

Synchronized references to the coherent I/Q sum collection indices from the energy grid 225 are provided to peak processor 230 for further processing. A coherent I/Q sum report identifies the active frequency of the searcher 205 at the start of the second sample buffer 215, and the index and size of any frequency delta (of the searcher 205) applied during the coherent I/Q sum collection. This information allows the coherent I/Q sums to be corrected for any sequential tracking loop frequency modifications and will drive false frequency lock detection. The sequential tracking control 240 provides overall control to searcher freq/phase control 295 and AFC state control 245.

Peak processor 230 performs full peak processing on the energy grid 225 and sends the peak processing results to the measurement controller. Upon receipt of the peak processing results, the measurement controller performs the following sequential tracking loop operations:

Step 1: Check if a valid peak has been identified. A valid peak exceeds a declared threshold, which is a function of the integration time but is not the result of cross correlation. The peak report provided by the peak processor 230 allows up to 2 peaks separated in frequency to be reported; this allows identification of a second true peak even when the energy grid 225 is contaminated by a cross correlation jammer.

Step 2: If no valid peak is identified in step 1, then check to see if the maximum allowed integration time has been achieved.

Step 2a: If the maximum integration time limit has been reached, then terminate integration and resample the dedicated satellite list logic. If the current satellite uncertainties align with the dedicated list membership requirements, then a subsequent integration time will commence.

Step 2b: If the maximum integration time limit has not been reached, then allow integration to continue.

Step 3: If a valid peak is identified in step 1, update the satellite measurement data base. The measurement data base updates will strobe cross correlation tests of other satellites and drive the satellite measurement differences algorithm. Calculate the delta carrier frequency and delta code phase modifications required to re-center the signal in the energy grid 225 and send to the channel controller.

After the sequential tracking loop operation has been completed, the measurement controller flushes the second sample buffer 215. Initial checks based upon the prior sequential loop tracking activity are performed before data flushing occurs.

If the second order AFC loop is active, check for a false frequency lock by comparing the sequential loop frequency estimate with the AFC frequency estimate referenced to the integration period mid point. If the absolute difference exceeds 12.5 Hz, then the second order AFC loop is re-centered by aligning the software rotator value to be consistent with the sequential tracking loop estimate. Additionally, if the second order AFC loop is active, sequential loop modifications to the active software rotator must be removed from the second sample buffer 215. Processing is not performed if the second order AFC loop is open.

Simulation Results

A simulation is performed to confirm the tracking loop function and to estimate the impact on bit error rate (BER) and tracking loop performance under varying values of frequency ramp and received $C/N_0$. Additionally, simulations also quantify the impact of the processing latency.

A simulation has been constructed in Matlab that allows configuration of $C/N_0$, received signal dynamics and processing delay. Raw and propagated measurement errors are estimated, BER analysis is estimated, and False Lock detection processing is also measured. The simulation mimics the offline processing of both loop types, sequential tracking loop and second order AFC loop. Simulation results have shown that there is no appreciable difference between the 0 ms and 100 ms processing latency loops.

Figure 6:
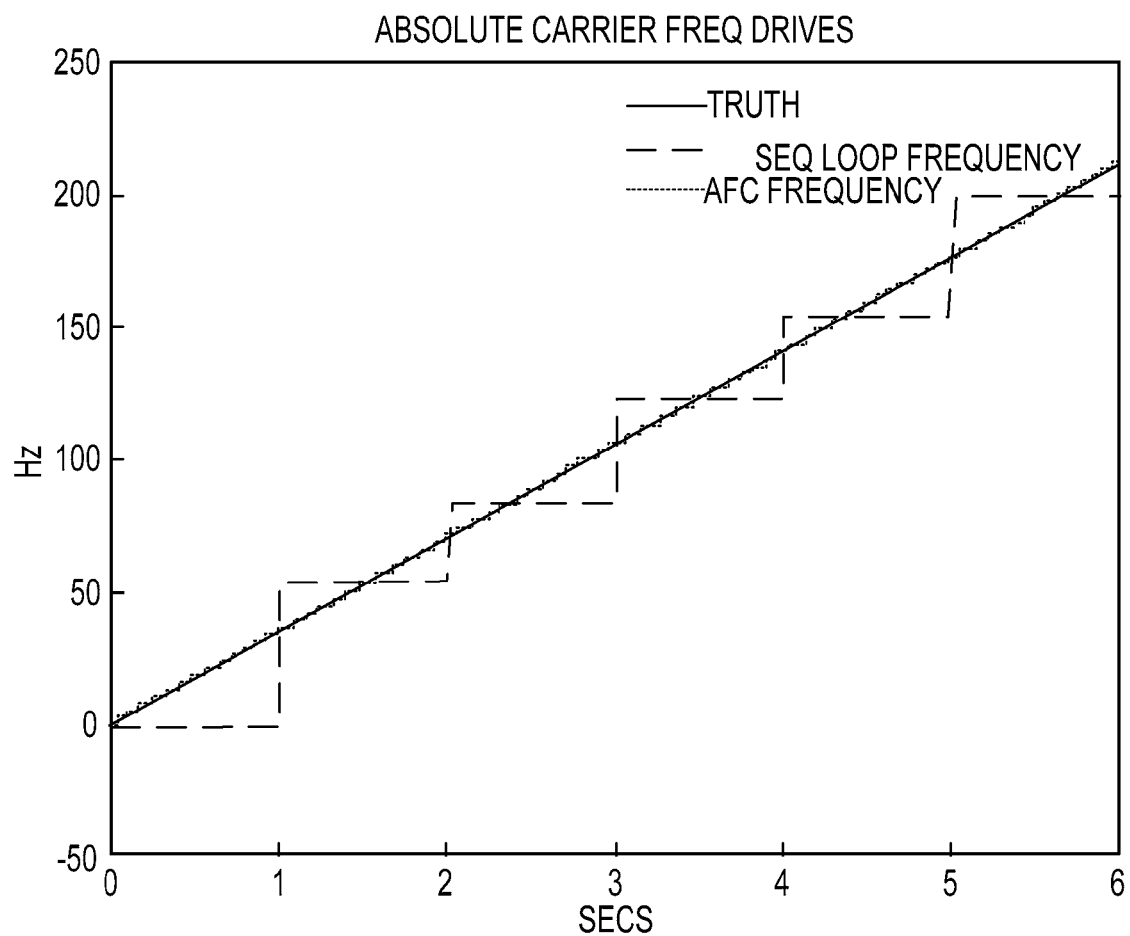
FIG. 6 illustrates the response of the sequential tracking loop and the second order AFC loop to a 35-Hz/sec constant-frequency ramp.

FIG. 6 illustrates the response of the sequential tracking loop and the second order AFC loop to a 35-Hz/sec constant frequency ramp. Note that the offline frequency delta correction scheme ensures that the large frequency steps applied by the sequential tracking loop have no impact upon the second order AFC loop.

Figure 7:
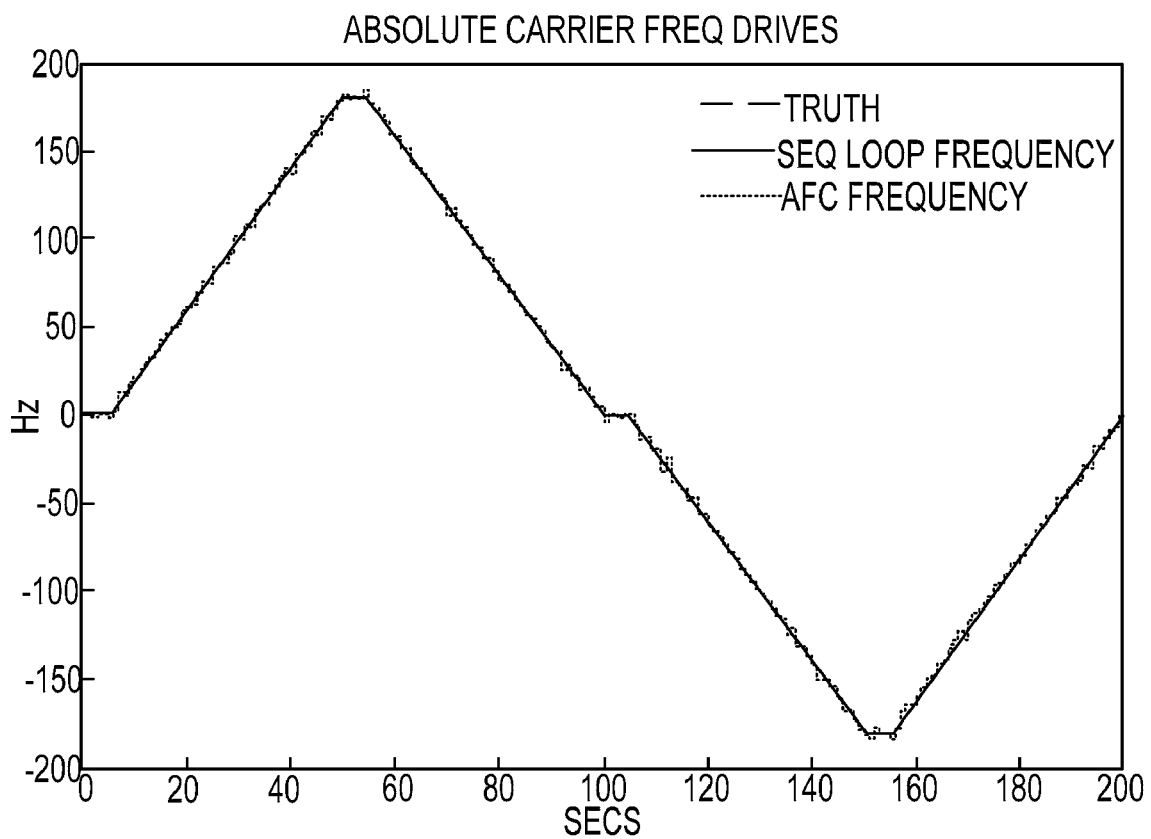
FIG. 7 illustrates the response of the sequential tracking loop and the second order AFC loop to a velocity profile (VPF1) that switches between ±4 Hz/sec and 0 Hz/sec.
Figure 8:
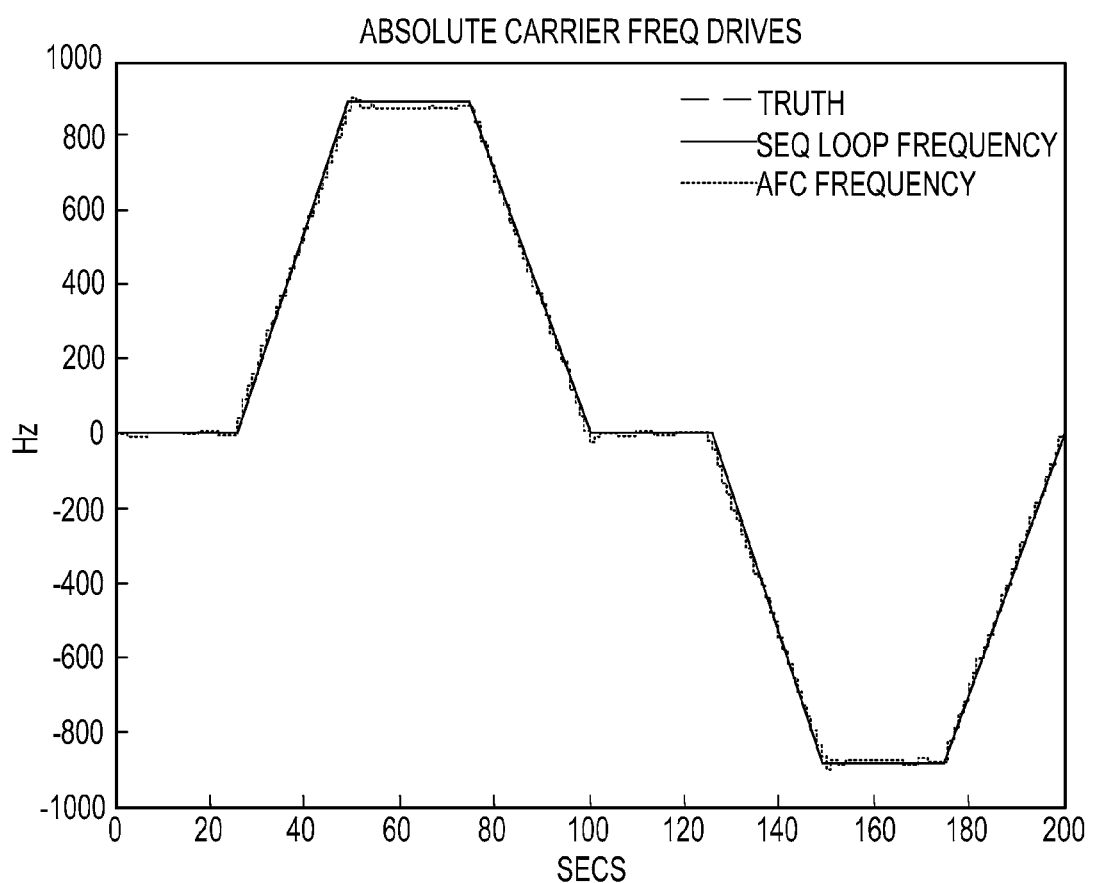
FIG. 8 illustrates the response of the sequential tracking loop and the second order AFC loop to a velocity profile (VPF2) that switches between ±35 Hz/sec and 0 Hz/sec.

FIG. 7 illustrates the response of the sequential tracking loop and the second order AFC loop to a velocity profile (VPF1) that switches between ±4 Hz/sec and 0 Hz/sec. FIG. 8 illustrates the response of the sequential tracking loop and the second order AFC loop to a velocity profile (VPF2) that switches between ±35 Hz/sec and 0 Hz/sec. These velocity profiles are used in the simulations to verify loop performance in the presence of vehicle dynamics.

Figure 9:
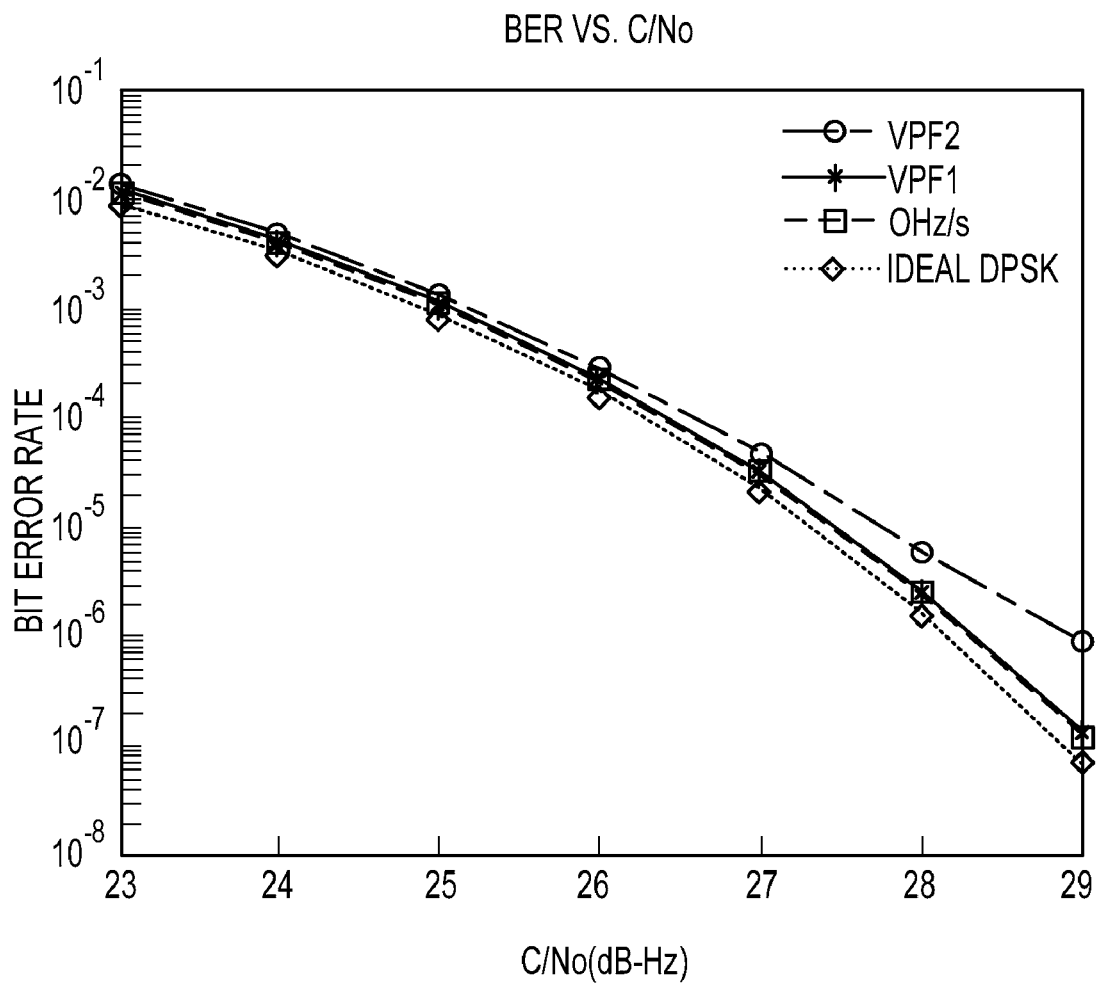
FIG. 9 illustrates the bit error rate (BER) results derived from Monte Carlo simulations of the tracking and data demodulation functions across the $C/N_0$ range of 23 to 29 dB-Hz.

FIG. 9 illustrates the BER results derived from Monte Carlo simulations of the tracking and data demodulation functions across the $C/N_0$ range of 23 to 29 dB-Hz. Frequency ramps of 4 Hz/sec and 35 Hz/sec were used. Processing latencies of 100 ms (5 bits) were employed. The BER performance differs from the ideal curve by approximately 0.15 dB.

Figure 10:
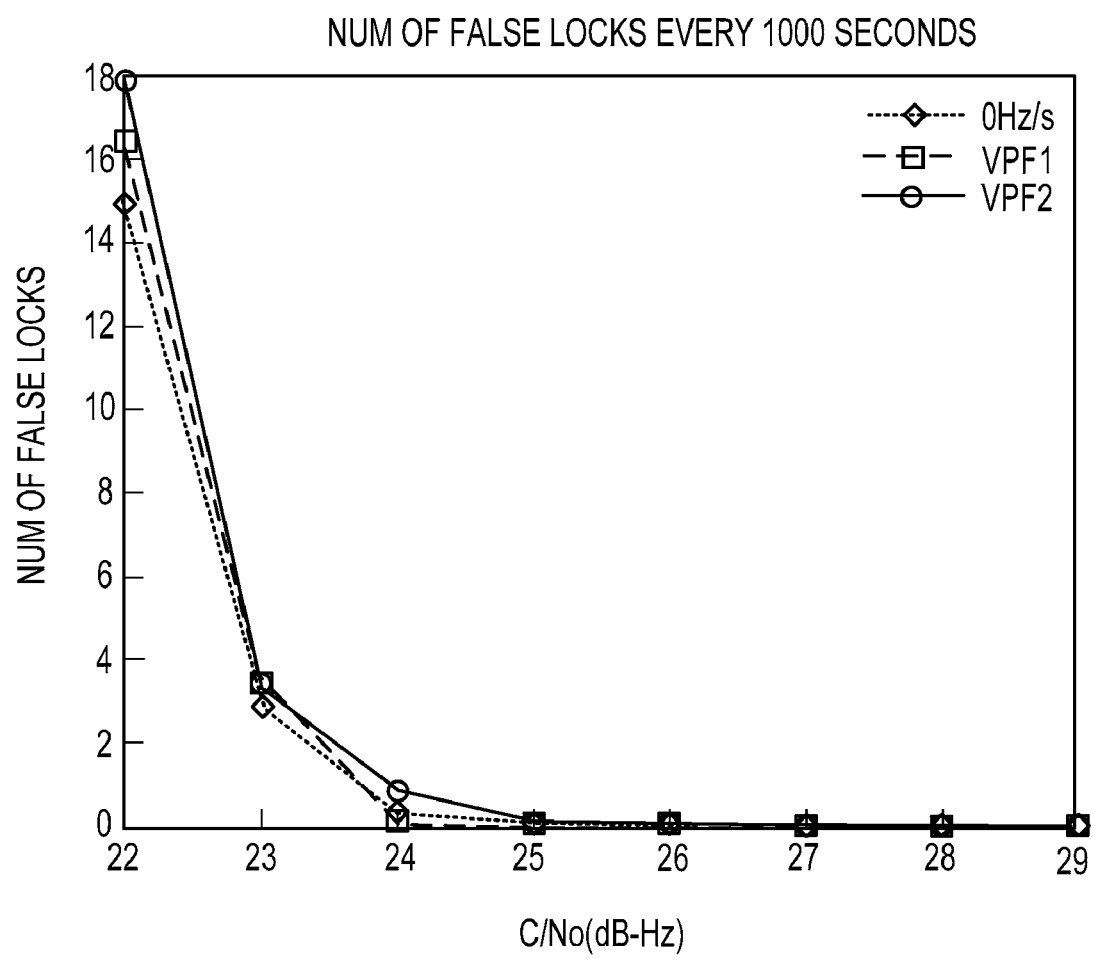
FIG. 10 illustrates the False Lock behavior observed during simulations.
Figure 11:
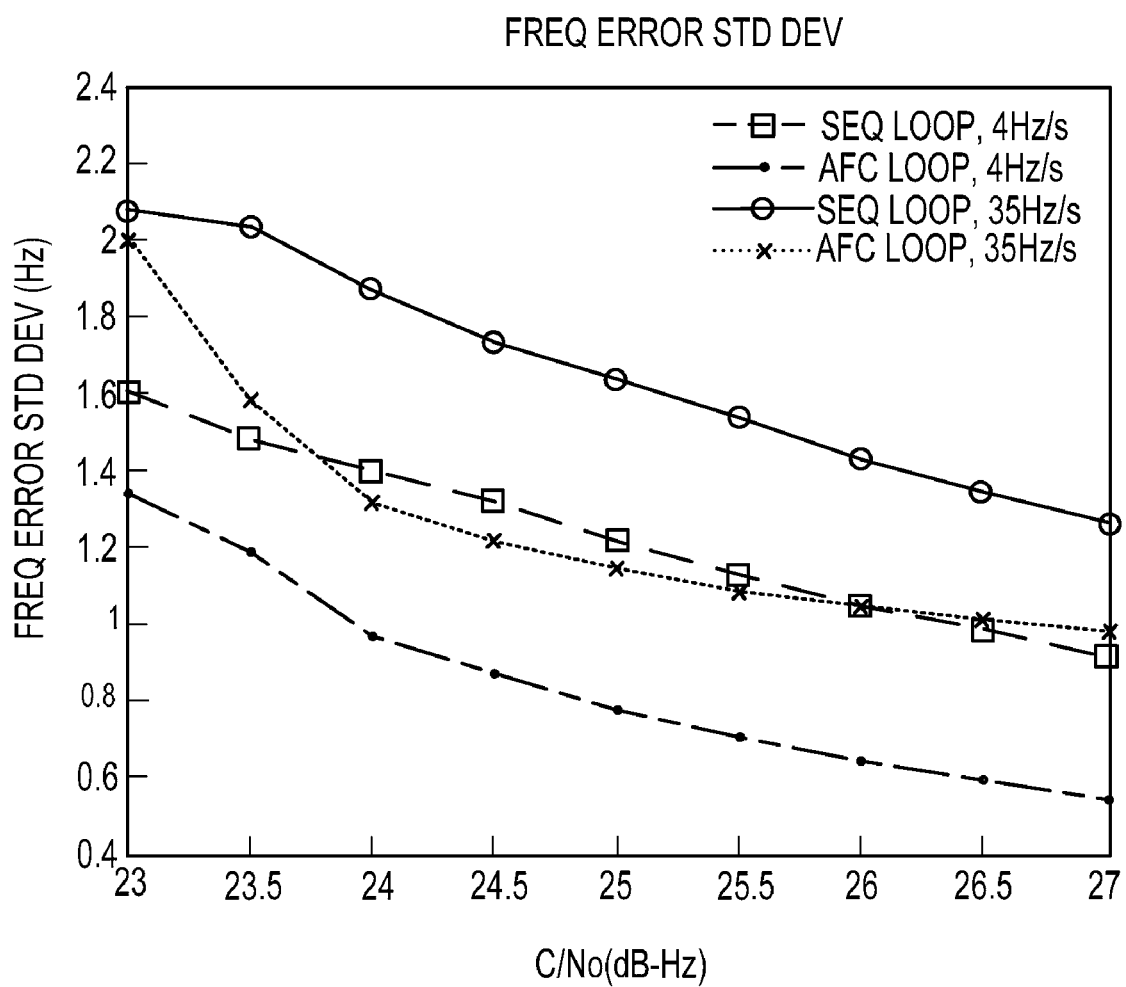
FIG. 11 illustrates the standard deviations of the observed frequency error for both the sequential tracking loop and the second order AFC loop.

The False Lock behavior observed during these simulations is illustrated in FIG. 10. A measure of tracking performance can be derived from the error in the frequency observable. The standard deviations of the observed frequency error for both sequential tracking loop and second order AFC loop are plotted in FIG. 11.

Figure 12:
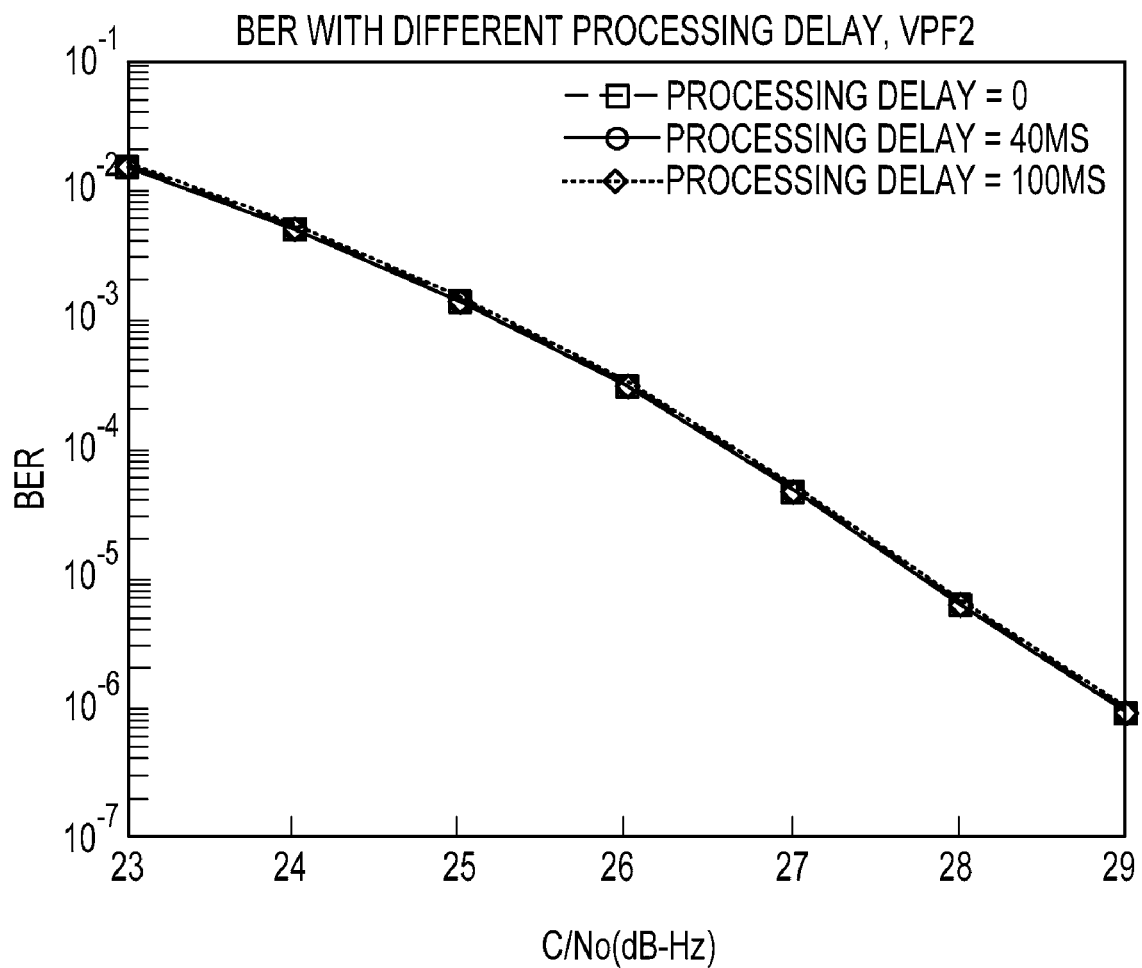
FIG. 12 illustrates the bit error rate (BER) with different processing delays for the VPF2 velocity profile.
Figure 13:
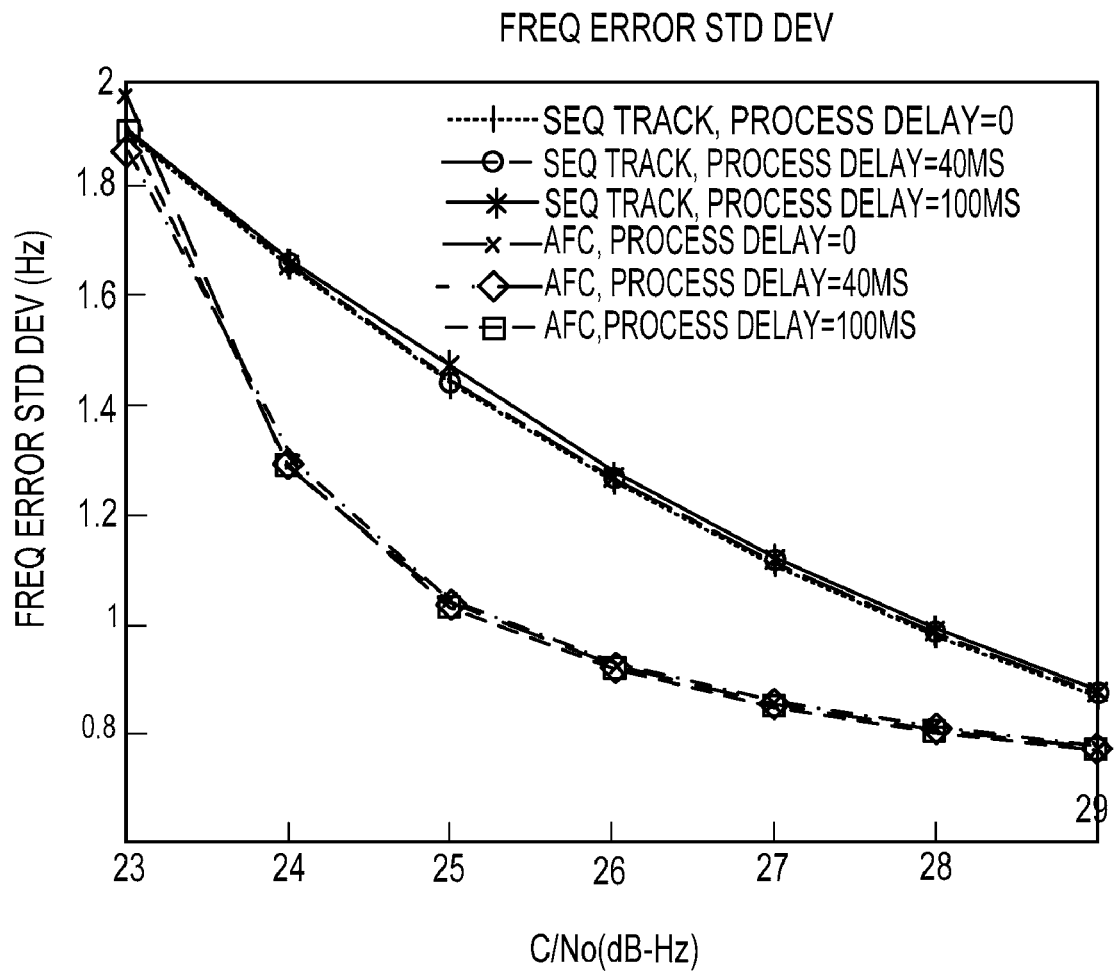
FIG. 13 illustrates the frequency error standard deviation with different processing delays.

FIG. 12 illustrates the Bit Error Rate with different processing delays for the VPF2 velocity profile. FIG. 13 illustrates the frequency error standard deviation with different processing delays. From FIG. 12 and FIG. 13, there is no appreciable difference between the 0 ms and 100 ms processing latency loops.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A receiver for tracking and data demodulation comprising:
   a baseband mixer having an output for providing I/Q data;
   a sequential tracking unit to sequentially track a desired signal with a variable integration time, the sequential tracking unit comprising
      an integrator having an input coupled to the output of the baseband mixer to receive the I/Q data, the integrator using a variable integration time;
      a peak processor coupled to the integrator; and
      a controller coupled to the peak processor to provide an adjustment signal; and
   an automatic frequency control (AFC) loop to perform automatic frequency control of the desired signal, the AFC loop comprising
      a data input coupled to the output of the baseband mixer to receive the I/Q data;
      a control input coupled to the controller to receive the adjustment signal; and
      a data demodulation unit to demodulate the desired signal.

2. The receiver of claim 1, wherein the sequential tracking unit estimates a searcher frequency delta and inputs the searcher frequency delta to the AFC loop.

3. The receiver of claim 2, wherein:
   the receiver includes a global navigation satellite systems (GNSS) receiver; and
   the desired signal is from a satellite.

4. The receiver of claim 1, wherein the AFC loop uses offline software for performing automatic frequency control of the desired signal.

5. The receiver of claim 1, wherein the data demodulation unit demodulates over an operating range of the desired signal.

6. The receiver of claim 1, wherein the sequential tracking unit uses variable bandwidths.

7. The receiver of claim 1, wherein the AFC loop is deactivated and realigned if a False Lock is detected.

8. The receiver of claim 7, wherein the False Lock is detected by the AFC loop.

9. The receiver of claim 1, wherein the sequential tracking unit includes a searcher center frequency, and wherein the sequential tracking unit estimates an estimated frequency of the desired signal.

10. The receiver of claim 9, wherein the sequential tracking unit predicts a predicted frequency of the desired signal based on the estimated frequency.

11. The receiver of claim 10, wherein the sequential tracking unit estimates a current searcher frequency delta based on a difference between the predicted frequency and the searcher center frequency.

12. The receiver of claim 11, wherein the searcher frequency delta is used to correct a coherent I/Q sum.

13. The receiver of claim 12, wherein:
the receiver includes a global navigation satellite systems (GNSS) receiver; and
the desired signal is from a satellite.

14. A receiver for tracking and data demodulation comprising:
means for mixing a signal to provide I/Q data;
means for sequentially tracking a desired signal with a variable integration time, the act of sequentially tracking comprising
means for integrating the I/Q data to form integrated data;
means for detecting a peak of the integrated data; and
means for controlling an adjustment signal;
means for performing automatic frequency control of the desired signal based on the adjustment signal; and
means for demodulating the desired signal.

15. The receiver of claim 14, wherein the means for performing automatic frequency control includes means for deactivating and realigning if a False Lock is detected.

16. A method by a receiver for tracking a desired signal comprising:
mixing a signal to provide I/Q data;
sequentially tracking the desired signal with a variable integration time, the act of sequentially tracking comprising
integrating the I/Q data to form integrated data;
detecting a peak of the integrated data; and
controlling an adjustment signal;
performing automatic frequency control of the desired signal based on the adjustment signal; and
demodulating the desired signal.

17. The method of claim 16, wherein the desired signal is from a GPS satellite.

18. The method of claim 16, wherein:
the act of sequentially tracking includes estimating a searcher frequency delta; and
the act of performing automatic frequency control includes using the searcher frequency delta.

19. The method of claim 16, wherein the act of sequentially tracking includes searching over range and Doppler dimensions.

20. The method of claim 16, further comprising:
receiving a received signal; and
acquiring the desired signal from the received signal;
wherein the source of the received signal is from a Satellite Positioning System (SPS) source that is used for advanced forward link trilateration (AFLT).

21. The method of claim 16, further comprising:
receiving a received signal; and
acquiring the desired signal from the received signal;
wherein the source of the received signal is from a terrestrial source that is used for advanced forward link trilateration (AFLT).

22. The method of claim 16, wherein the act of demodulating includes demodulating over an operating range of the desired signal.

23. The method of claim 16, wherein the act of sequentially tracking includes using variable bandwidths.

24. The method of claim 16, wherein the act of performing automatic frequency control includes deactivating and realigning if a False Lock is detected.

25. The method of claim 24, wherein the act of performing automatic frequency control includes detecting the False Lock.

26. The method of claim 16, wherein the act of sequentially tracking includes:
using a searcher center frequency; and
estimating an estimated frequency of the desired signal.

27. The method of claim 26, wherein the act of sequentially tracking further includes predicting a predicted frequency of the desired signal based on the estimated frequency.

28. The method of claim 27, wherein the act of sequentially tracking further includes estimating a searcher frequency delta based on a difference between the predicted frequency and the searcher center frequency.

29. The method of claim 28, further comprising using the searcher frequency delta to correct a coherent I/Q sum.

30. A non-transitory computer-readable medium including program code stored thereon, comprising:
program code to sequentially tracking a desired signal with a variable integration time, the act of sequentially tracking comprising
program code to integrate I/Q data to form integrated data;
program code to detect a peak of the integrated data; and
program code to control an adjustment signal;
program code to perform automatic frequency control of the desired signal based on the adjustment signal; and
program code to demodulate the desired signal.

31. The computer-readable medium of claim 30, further comprising program code to estimate a searcher frequency delta and to input the searcher frequency delta for performing automatic frequency control.

32. The computer-readable medium of claim 31, wherein the desired signal is from a GPS satellite.

* * * * *